US009684652B2

(12) United States Patent
Connor et al.

(10) Patent No.: US 9,684,652 B2
(45) Date of Patent: Jun. 20, 2017

(54) MULTICULTURAL COMMUNICATION MANAGEMENT

(71) Applicant: International Business Machines Corporation, Armonk, NY (US)

(72) Inventors: Samuel R. Connor, Apex, NC (US); Jonathan W. Jackson, Durham, NC (US); Joseph Kuczynski, North Port, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 13 days.

(21) Appl. No.: 14/821,787

(22) Filed: Aug. 10, 2015

(65) Prior Publication Data

US 2017/0046336 A1 Feb. 16, 2017

(51) Int. Cl.
*G06F 17/28* (2006.01)

(52) U.S. Cl.
CPC ............................ *G06F 17/2881* (2013.01)

(58) Field of Classification Search
CPC ...... G06Q 10/10; G06Q 10/06; G06Q 10/107; G06Q 50/18; G06Q 10/0637
USPC ..... 704/2, 275, 272, 276, E21.019; 709/202; 707/608; 715/731; 434/157
See application file for complete search history.

(56) References Cited

U.S. PATENT DOCUMENTS

| 8,775,530 B2 | 7/2014 | Rakshit |
| 8,798,596 B2 | 8/2014 | Shuster et al. |
| 2014/0189016 A1 | 7/2014 | Goldsmith et al. |
| 2014/0379812 A1* | 12/2014 | Bastide, II .............. H04L 51/12 709/206 |

OTHER PUBLICATIONS

IBM; "System for Automated Cross-culture and Cross-geography Correctness Verification in Communication Systems"; An IP.com Prior Art Database Technical Disclosure; http://ip.com/IPCOM/000191548; Jan. 7, 2010.
Anonymously; "Method and System for Customizing Culture-Based Translation of Nonverbal Communication in Video Conference Systems"; An IP.com Prior Art Database Technical Disclosure; http://ip.com/IPCOM/000239192; Oct. 20, 2014.
Anonymously; "Situations exchanger system for effective on-line communication"; An IP.com Prior Art Database Technical Disclosure; http://ip.com/IPCOM/000200719; Oct. 26, 2010.

(Continued)

*Primary Examiner* — Charlotte M Baker
(74) *Attorney, Agent, or Firm* — Kevin Kehe

(57) ABSTRACT

Disclosed aspects include initiating an electronic communication configured to be transmitted to a first intended recipient. Based on a set of profile data, a first cultural indicator may be identified for the first intended recipient. Using a natural language processing technique, a cultural element of the electronic communication may be detected. Based on both the first cultural indicator and the cultural element, a first cultural-version of the cultural element may be determined for the first intended recipient. Using the first cultural-version, a cultural translation object may be established in the electronic communication. In response to establishing the cultural translation object in the electronic communication, the electronic communication may be transmitted to the first intended recipient.

20 Claims, 7 Drawing Sheets

(56) References Cited

OTHER PUBLICATIONS

Chung, Hyemin; "GlobalMind—Bridging the Gap Between Different Cultures and Languages with Common-sense Computing"; <http://web.media.mit.edu/~lieber/Teaching/Common-Sense-Course/Hyemin-Thesis.pdf>; Sep. 2006.
Connor et al., "Multicultural Communication Management", U.S. Appl. No. 15/043,542, filed Feb. 13, 2016.
List of IBM Patents or Patent Applications Treated As Related.

* cited by examiner

MULTICULTURAL COMMUNICATION MANAGEMENT

BACKGROUND

This disclosure relates generally to computer systems and, more particularly, relates to managing electronic communications between users with different cultural backgrounds. The amount of data that needs to be managed by enterprises is increasing. Management of electronic communications may be desired to be performed as efficiently as possible. As data needing to be managed increases, the need for management efficiency may increase.

SUMMARY

Aspects of the disclosure are directed toward initiating an electronic communication configured to be transmitted to a first intended recipient. Based on a set of profile data, a first cultural indicator may be identified for the first intended recipient. Using a natural language processing technique, a cultural element of the electronic communication may be detected. Based on both the first cultural indicator and the cultural element, a first cultural-version of the cultural element may be determined for the first intended recipient. Using the first cultural-version, a cultural translation object may be established in the electronic communication. In response to establishing the cultural translation object in the electronic communication, the electronic communication may be transmitted to the first intended recipient.

In embodiments, geographies of participants or recipients can be determined. An integrated semantic analysis may be utilized to determine tone or use of language. Suggestions or dynamically corrected communication structure may be provided in a manner that fits a cultural norm. In embodiments, a first reply-all which includes the electronic communication may be received from the first intended recipient. Also, a second reply-all which includes the first reply-all can be received from the second intended recipient in response to the first reply-all. As such, the first cultural-version may not be presented in the second-reply all. Accordingly, aspects of the present disclosure may provide performance or efficiency benefits (e.g., speed, resource usage, responsiveness, flexibility, productivity).

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
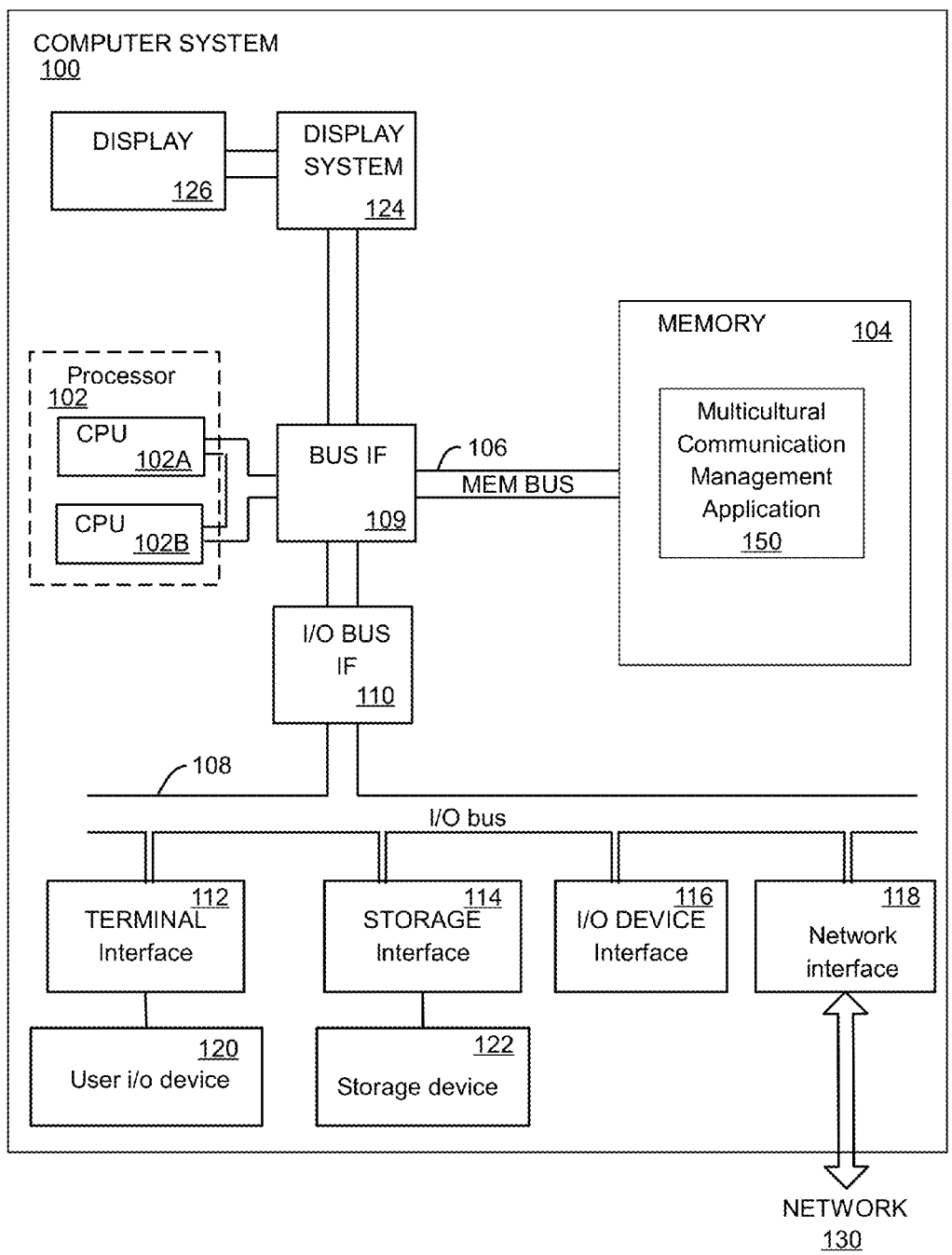
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to facilitating electronic communication between users with various cultural backgrounds. For example, an electronic communication composed by an individual with a first cultural background may include one or more cultural elements that may not be readily understood by a recipient of the electronic communication who has a second cultural background different from the first cultural background. Accordingly, aspects of the disclosure relate to generating a modified cultural-version of the electronic communication with culturally specific elements normalized in order to facilitate communication between the two parties. Multiple different cultural-versions may be generated for electronic communications involving multiple recipients.

As globalization and communication between individuals of differing cultural backgrounds increases, the need for culturally-aware communication continues to grow in relevance. In order to facilitate efficient and culturally-appropriate communication in an international environment, positive impacts may result from recognizing cultural differences and being aware of the backgrounds, beliefs, and attitudes of other individuals. Aspects of the present disclosure relate to the recognition that in certain situations it can be challenging for individuals to keep track of the cultural differences and attitudes of others, especially when engaging in communication with culturally diverse groups. Accordingly, aspects of the present disclosure relate to a system and method for facilitating culturally-aware communication between individuals of cultural backgrounds. In embodiments, the present disclosure relates to identifying the cultural background of one or more recipients of a communication (e.g., based on a cultural indicator of the recipient) and generating a cultural-version (e.g., a version of the communication adapted, revised, or modified for the target culture) of the communication to transmit to one or more intended recipients. Aspects of the present disclosure may be associated with benefits including communication clarity, speed, and efficiency.

Aspects of the disclosure include a method, system, and computer program product for managing multicultural electronic communication. In embodiments, aspects may include initiating, by a user, an electronic communication configured to be transmitted to both a first intended recipient and a second intended recipient. In embodiments, the first intended recipient and the second intended recipient may have different cultural backgrounds. Aspects of the disclosure include identifying, based on a set of profile data, a first cultural indicator for the first intended recipient and a second cultural indicator for the second recipient. The set of profile data may be selected from a group consisting of at least one of a computer network address, an internet protocol address, a time zone, a keyboard layout, a social media profile, a machine-learned cultural-norm, a corporate human resources database, or an email signature.

Aspects of the disclosure include detecting, using a natural language processing technique, a cultural element of the electronic communication. The cultural element may be selected from a group consisting of at least one of a tone element, a language-use element, or a culture-specific element. The natural language processing technique may be configured to parse semantic and syntactic content of the electronic communication to detect one or more cultural elements of the electronic communication.

Aspects of the disclosure include determining, based on the both the first cultural indicator and the cultural element, a first cultural-version of the cultural element for the first intended recipient. The method may also include determining a second cultural-version of the cultural element for a second intended recipient based on the second cultural indicator and the cultural element. In embodiments, determining the first (second) cultural-version of the cultural element may include identifying a cultural database which corresponds to the first (second) cultural indicator. The method may include searching the cultural database for the cultural element, and ascertaining a set of matches for the cultural element in the cultural database.

In embodiments, determining the first (second) cultural-version of the cultural element for the first (second) intended recipient may be based on the set of matches ascertained for the cultural element in the cultural database. In embodiments, determining the first (second) cultural-version of the cultural element may include displaying the set of matches to the user, and receiving a user input which selects the first (second) cultural-version based on the set of matches. In embodiments, determining the first (second) cultural-version of the cultural element for the first (second) intended recipient may include analyzing, using a set of culture-oriented natural language processing techniques, the cultural element. In certain embodiments, the cultural element may include a lack of a greeting, the first cultural-version may include a first greeting, and the second cultural-version may include a second greeting.

Aspects of the disclosure include establishing, using both the first cultural-version and the second cultural-version, a cultural translation object in the electronic communication. In embodiments, the method may include tagging the cultural element with a tagged block, and appending both the first cultural-version and the second cultural-version to the tagged block. Based on and in response to appending to the tagged block both the first cultural-version and the second cultural-version, the method may include establishing the cultural translation object. In embodiments, the cultural translation object may include both the first cultural-version and the second cultural-version. The cultural translation object may be configured to present the first cultural-version to the first intended recipient and the second cultural-version to the second intended recipient.

Aspects of the disclosure may include transmitting, in response to establishing the cultural translation object in the electronic communication, the electronic communication to both the first intended recipient and the second intended recipient. In embodiments, aspects of the disclosure may include receiving, from the first intended recipient, a first reply-all which includes the electronic communication. Additionally, the method may also include receiving, from the second intended recipient in response to the first reply-all, a second reply-all which includes the first reply-all. As such, the first cultural-version may not be presented in the second-reply all.

In embodiments, the method may include receiving, the by second intended recipient from the first intended recipient, a first reply-all which includes the electronic communication. As such, the first cultural-version may not be presented in the first reply-all. The method may also include receiving, from the second intended recipient in response to the first reply-all, a second reply-all which includes the first reply-all. As such, the second cultural-version may not be presented in the second reply-all. Additionally, in certain embodiments, the method may include receiving a forwarded communication by an added recipient from the first intended recipient. The forwarded communication may include a third cultural-version.

Altogether, aspects of the disclosure include determining one or more cultural-versions of a cultural element in an electronic communication, and establishing one or more cultural translation objects to facilitate communication between individuals with different cultural backgrounds. Accordingly, aspects of the present disclosure may provide performance or efficiency benefits (e.g., speed, resource usage, responsiveness, flexibility, productivity).

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a multicultural communication management application 150. In embodiments, the multicultural communication management application 150 may include instructions or statements that execute on the processor 102 or instructions or statements that are interpreted by instructions or statements that execute on the processor 102 to carry out the functions as further described below. In certain embodiments, the multicultural communication management application 150 is implemented in hardware via semiconductor devices, chips, logical gates, circuits, circuit cards, and/or other physical hardware devices in lieu of, or in addition to, a processor-based system. In embodiments, the multicultural communication management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
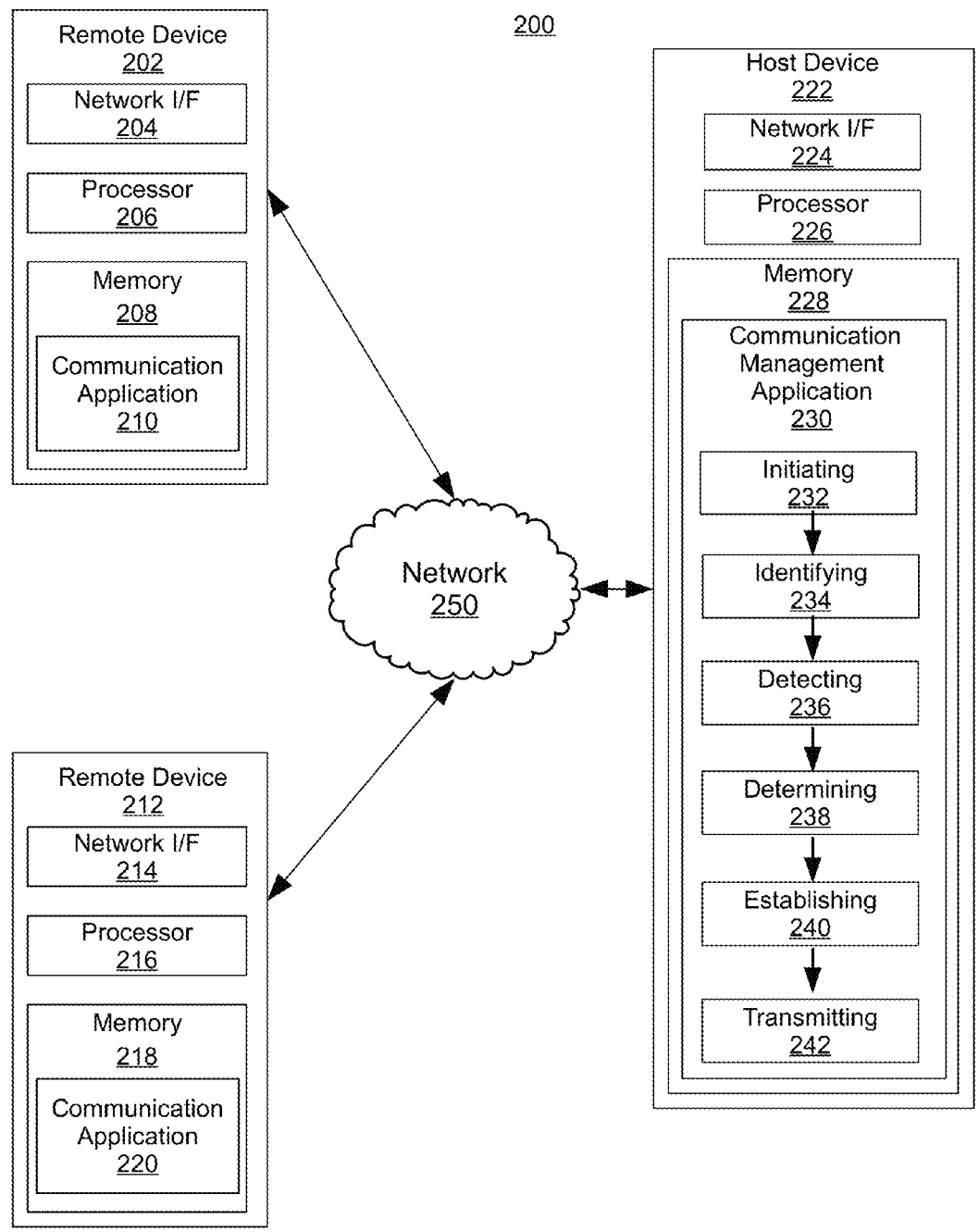
FIG. 2 is a diagrammatic illustration of an example computing environment according to embodiments.

FIG. 2 is a diagrammatic illustration of an example computing environment 200, consistent with embodiments of the present disclosure. In certain embodiments, the environment 200 can include one or more remote devices 202, 212 and one or more host devices 222. Remote devices 202, 212 and host device 222 may be distant from each other and communicate over a network 250 in which the host device 222 comprises a central hub from which remote devices 202, 212 can establish a communication connection. Alternatively, the host device and remote devices may be configured in any other suitable relationship (e.g., in a peer-to-peer or other relationship).

In certain embodiments the network 250 can be implemented by any number of any suitable communications media (e.g., wide area network (WAN), local area network (LAN), Internet, Intranet, etc.). Alternatively, remote devices 202, 212 and host devices 222 may be local to each other, and communicate via any appropriate local communication medium (e.g., local area network (LAN), hardwire, wireless link, Intranet, etc.). In certain embodiments, the network 250 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

Consistent with various embodiments, host device 222 and remote devices 202, 212 may be computer systems preferably equipped with a display or monitor. In certain embodiments, the computer systems may include at least one processor 206, 216, 226 memories 208, 218, 228 and/or internal or external network interface or communications devices 204, 214, 224 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices.

In certain embodiments, remote devices 202, 212 may include a communication application 210, 220. The communication application 210, 220 may be configured to exchange (e.g., send and receive) electronic communications with the host device 222 as well as other devices. As described herein, a communication management application 230 of the host device 222 may be configured to engage in electronic communication with the remote devices 202, 212, and facilitate multicultural communication between one or more recipients of an electronic communication.

The communication management application 230 may include a set of operations. The set of operations may include an initiating operation 232, an identifying operation 234, a detecting operation 236, a determining operation 238, an establishing operation 240, and a transmitting application 242. The initiating operation 232 may be configured to initiate an electronic communication to be transmitted to a first intended recipient (e.g., the remote device 202). The identifying operation 234 may be configured to identify a first cultural indicator for the first intended recipient based on a set of profile data. The detecting operation 236 may be configured to detect a cultural element of the electronic communication using a natural language processing technique. The determining operation 238 may be configured to determine a first cultural-version of the cultural element based on both the first cultural indicator and the culture element. The establishing operation 240 may be configured to use the first cultural-version to establish a cultural translation object in the electronic communication. The transmitting operation 242 may be configured to transmit the electronic communication to the first intended recipient in response to establishing the cultural translation object in the electronic communication. Operations other than those described explicitly herein are also possible.

Figure 3:
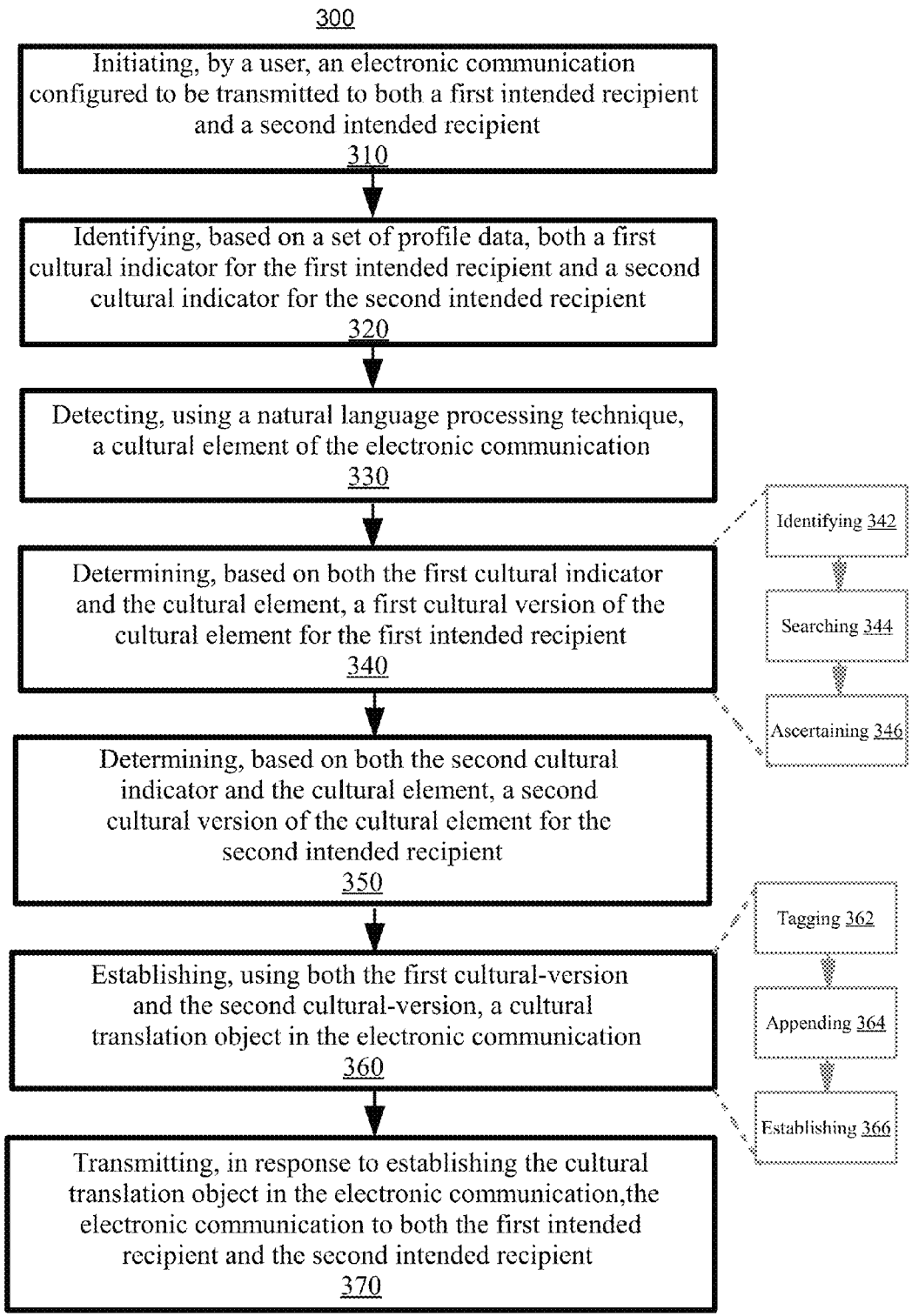
FIG. 3 is a flowchart illustrating a method of multicultural electronic communication management according to embodiments.

FIG. 3 is a flowchart illustrating a method 300 of multicultural electronic communication management, consistent with various embodiments. Aspects of the method 300 are directed toward establishing one or more cultural translation objects in an electronic communication based on a cultural element of the electronic communication and one or more cultural indicators of intended recipients of the communication. The method 300 may include an initiating block 310, an identifying block 320, a detecting block 330, a first determining block 340, a second identifying block 342, a searching block 344, an ascertaining block 346, a second determining block 350, an establishing block 360, a tagging block 362, an appending block 364, a second establishing block 366, and a transmitting block 370.

At block 310, an electronic communication is initiated by a user. The electronic communication may be configured to be transmitted to both a first intended recipient and a second intended recipient. The electronic communication may include an email message, a text message, instant message, voice message, or other form of communication. Initiating the electronic communication may include instantiating or opening a program, application, or other service (email service, texting application) configured to support electronic communication between one or more users. In embodiments, initiating the electronic communication may also include preparing the electronic communication for transmission. For instance, upon opening an email application, the user may select one or more intended recipients for the email, and compose the content of the email (e.g., write the message body, attach a file). As described herein, in certain embodiments, the electronic communication may be configured to be transmitted to multiple recipients (e.g., a first recipient and a second recipient). Greater or fewer numbers of recipients are also possible.

At block 320, a first cultural indicator is identified for the first intended recipient and a second cultural indicator is identified for the second intended recipient. In embodiments, the identification of the first and second cultural indicators may be based on profile data for the first intended recipient and the second intended recipient, respectively. Profile data for the first intended recipient and the second intended recipient may include a computer network address, an internet protocol address, a time zone, a keyboard layout, a social media profile, a machine learned cultural-norm, a corporate human resources database, or an e-mail signature. Generally, the cultural indicator may include an aspect or element of the profile data that indicates the likely cultural background of the intended recipient. For instance, one or more factors including the name, location, native language, word choice, email composition style, and the like may be analyzed to determine the likely cultural background of the intended recipient.

In embodiments, certain information may be of greater use in determining the likely cultural background of the intended recipients than other information (e.g., the native language of an individual may be considered more useful in determining their likely culture than the present time zone of the user). Accordingly, aspects of the present disclosure relate to weighting the potential cultural indicators to determine the likelihood that an individual belongs to a particular culture. Consider the following example. In embodiments, an individual named Kim Min-Jun may be selected as the first recipient of an electronic communication. Location information gathered for Kim Min-Jun (i.e., from a social media profile) may indicate his present location is in Australia. The method 300 may determine from past email correspondence that Kim Min-Jun's communication is predominantly in German, and that he is an employee of a German company. Accordingly, aspects of the present disclosure may be directed toward weighting a potential cultural indicator to determine the likely cultural background of the first intended recipient. To illustrate, the potential cultural indicator may be given a weighting value in the form of a percentile between 1 and 100. For instance, an individual's native language may be given a weighting value of 40, name origin may be given a weighting value of 20, present location may be given a weighting value of 10, and company location may be given a weighting value of 30. Accordingly, Kim Min-Jun may be determined to have a German cultural background (e.g., based on his native language of German and workplace in Germany, it may be determined that he is likely an individual of Korean descent raised in Germany and currently on a trip to Australia). Other methods of assigning weighting values and determining culture indicators are also possible.

At block 330, a cultural element of the electronic communication is detected. In embodiments, the cultural element may be detected using a natural language processing technique. Generally, the cultural element may be an aspect, component, facet, or portion of the electronic communication that may lead to a potential cultural misunderstanding. Accordingly, aspects of the present disclosure are directed toward detecting the cultural element of the electronic communication and establishing a cultural translation object for the recipients of the electronic communication to facilitate multicultural communication. In embodiments, the cultural element may include a tone element (e.g., sarcasm), a language-use element (e.g., word, phrase, idiom), a culture-specific element (e.g., pop culture reference) or the like.

In embodiments, the cultural element may be detected using a natural language processing technique. The natural language processing technique may be configured to parse both structured (e.g., tables, graphs) and unstructured data (e.g., textual content containing words, numbers, dates) contained in the electronic communication. The natural language processing technique may be a software tool, widget, or other program configured to analyze and identify the semantic and syntactic elements and relationships present in the content of the electronic communication (e.g., textual data, audio data, video data. Further, the natural language processing technique may be configured to parse the grammatical constituents, parts of speech, context, and other relationships (e.g., modifiers) of the electronic communication. The natural language processing technique can be configured to recognize keywords, context information, and metadata tags associated with words, phrases, or sentences, as well as analyze summary information, keywords, figure captions, or text descriptions to identify syntactic and semantic elements. The syntactic and semantic elements can include information such as word frequency, word meanings, text font, italics, hyperlinks, proper names, noun phrases, parts-of-speech, or the context of surrounding words. Other syntactic and semantic elements are also possible.

The electronic communication may be parsed using a natural language processing technique to detect one or more cultural elements. Consider the following example of the contents of an electronic communication: "While I recognize the potential risks of the strategy that marketing has cooked up, in this case I see little alternative. Although we risk jumping out of the frying pan and into the fire, with the recent shakeup in the marketplace it's imperative that we get the word out there before this thing snowballs."

Consistent with various embodiments, the natural language processing technique may detect multiple cultural elements present in the example electronic communication included above. For example, in response to parsing the semantic and syntactic content of the example electronic communication, the natural language processing technique may identify the phrases "cooked up," "jumping out of the frying pan and into the fire," "shakeup," "get the word out," and "snowballs," as cultural elements that may be revised to facilitate communication with individuals of different cultural backgrounds. In certain embodiments, at block 330 the method 300 may include highlighting, marking, tagging, flagging, or otherwise indicating the culture elements for modification or revision.

At block 340, the method 300 may include determining, based on both the first cultural indicator and the cultural element, a first cultural-version of the cultural element for the first intended recipient. Generally, the first cultural-version may be a modified, revised, or edited version of one or more cultural elements detected by the natural language processing technique of block 330. As described herein, in embodiments the first cultural-version may be tailored specifically for the first recipient based on the cultural indicator for the first recipient identified in block 320. For instance, particular expressions or idioms marked as cultural elements may be modified or changed to other expressions that may be more appropriate or easily understood by the first recipient.

In certain embodiments, determining the first cultural-version for the first intended recipient may include identifying a cultural database which corresponds to the first cultural indicator at block 342. The cultural database may include an organized archive of information having data regarding one or more cultures at least including the culture corresponding to the cultural indicator of the first recipient. For instance, the cultural database may include a number of expressions and idioms as well as corresponding translations or revisions in the target culture. The data in the cultural database may be either structured or unstructured, and organized using one or more of a number of file formats (e.g., plain text, XML, SQL, Perl DBM). At block 344 the method 300 may include searching the cultural database for the cultural element. In response to searching the cultural database, at block 346 the method 300 may include ascertaining a set of matches for the cultural element in the cultural database. The set of matches for the cultural element may include candidate words, phrases, expressions, and idioms semantically similar to the cultural element that may be used to replace, modify, revise, or edit the cultural element.

In embodiments, the method 300 may be configured to determine the first cultural-version of the electronic communication based on the set of matches. As an example, in certain embodiments, each candidate match of the set of matches may be tagged with an associated confidence value (e.g., an integer value expressed as a percent) indicating the likelihood that it is a suitable replacement for the cultural element. Accordingly, the method 300 may be configured to select the cultural element associated with the highest confidence value as the first cultural-version of the electronic communication. In certain embodiments, determining the first cultural-version of the cultural element for the first intended recipient may include displaying the set of matches to the user, and receiving a user input which selects the first cultural-version based on the set of matches. For example, the method 300 may include presenting a dialogue box to the user that displays the set of matches. The user may then select a particular candidate match of the set of matches as the first cultural-version. Other methods of determining the first cultural-version are also possible.

Consider once again the example electronic communication described above. In certain embodiments, the first intended recipient of the example electronic communication may be an individual identified as having a Korean cultural background. Further, the cultural elements detected at block 330 may be determined to be potential sources of miscommunication for an individual with a Korean cultural background. Accordingly, at block 340 the method may include generating a set of candidate matches for the cultural elements detected at block 330. For instance, consider the following example cultural elements, corresponding cultural-version candidates, and associated confidence values. For the cultural element of "cooked up", the set of candidate matches may include "devised" (71%), "concocted" (32%), "contrived" (21%), and "created" (58%). For the cultural element of "jumping out of the frying pan and into the fire," the set of candidate matches may include "going from a bad situation to a worse one" (66%). For the cultural element of "shake up," the set of candidate matches make include "disturbance" (82%), "commotion" (36%), "upset" (25%), and "disorder" (29%). For the cultural element of "get the word out" the cultural-version candidates may include "make it known to the public" (54%). For the cultural element of "snowballs," the cultural-version candidates may include "escalates" (76%) and "intensifies" (59%). Accordingly, as described herein, one or more of the cultural-version candidates presented herein may be used to replace, annotate, or otherwise supplement the original cultural element of the electronic communication. Other cultural-version candidates, as well as methods of determining the cultural-version are also possible.

In embodiments, determining the first cultural-version of the electronic communication may include analyzing the cultural element using a set of culture-oriented natural language processing techniques. The set of culture-oriented natural language processing techniques may be specialized techniques adapted to a particular culture, language, or language family, and be configured to evaluate the communicative effectiveness of the cultural element. The cultural element may be scored with an integer value indicating the likelihood of a communication misunderstanding occurring as a result of the cultural element. Additionally, the culture-oriented natural language processing techniques may be configured to provide explanations to the user of the nuances of the cultural element, and the way it may be interpreted by an individual of the target culture. Other uses for the culture-oriented natural language processing techniques are also possible.

As described herein, aspects of the present disclosure are directed toward determining multiple cultural-versions of the cultural element for different intended recipients of the electronic communication. Accordingly, at block 350, the method 300 may include determining a second cultural-version of the cultural element for a second intended recipient of the electronic communication. Determining the second cultural-version for the second intended recipient may substantially correspond to determining the first cultural-version for the first intended recipient. Accordingly, the methods and techniques described herein for determining the first cultural-version may also apply to determination of the second cultural-version for the second intended recipient. Further, determination of culture-versions for additional recipients of the electronic communication may substantially correspond to the method described herein.

Consider the following example. In certain embodiments, the cultural element may include a lack of a greeting. For instance, as in the example electronic communication above, the message may not include a salutation to the recipient(s) of the communication. Aspects of the present disclosure relate to the recognition that in certain cultures, initial salutations may be of cultural significance. Accordingly, in certain embodiments, a first cultural-version may be generated that includes a first greeting, and a second cultural-version may be generated that includes a second greeting. Other examples of cultural elements and corresponding cultural-versions are also possible.

At block 360, the method 300 may include establishing, using both the first cultural-version and the second cultural-version, a cultural translation object in the electronic communication. The cultural translation object may be a composite content element that is configured to provide one or more cultural-versions to one or more intended recipients of the electronic communication. In embodiments, the cultural translation object may include both the first and second cultural-version determined at blocks 340 and 350, respectively. In certain embodiments, the cultural translation object may be configured to present the first cultural-version to the first intended user, and the second cultural-version to the second intended user. In embodiments, the recipients of the electronic communication may choose to display other cultural-versions of the electronic communication other than the one initially presented (e.g., the first intended recipient may choose to view the second cultural-version).

In embodiments, establishing the cultural translation object in the electronic communication may include tagging the cultural element with a tagged block at block 362. The tagged block may be a textual composition attached to one or more cultural elements of the electronic communication. At block 364 the method 300 may include appending both the first cultural-version and the second cultural-version to the tagged block. In certain embodiments, the first cultural-version and the second cultural-version may be appended in a read-only format and prevent editing or alteration by a user. In certain embodiments, the first and second cultural-versions may be presented to the user for approval or interactive editing. As described herein, in certain embodiments the first cultural-version may be configured to be presented to the first intended user, and the second cultural-version may be configured to be presented to the second intended user. Accordingly, appending the first and second cultural-versions to the tagged block may include assigning a cultural category to each cultural-version indicating the cultural to which it corresponds and to which intended user it should be presented. At block 366, the method 300 may include establishing the cultural translation object both based on and in response to appending the first and second cultural-versions to the tagged. Establishing the cultural translation object may include creating, inserting, determining, appending, or otherwise instantiating the cultural-versions in the electronic communication.

At block 370, the method may include transmitting the electronic communication to both the first intended recipient and the second intended recipient. In embodiments, transmitting the electronic communication may be performed in response to establishing the cultural translation object. Transmitting the electronic communication may include sending, forwarding, broadcasting, replying, relaying, transferring, or otherwise conveying the electronic communication to the intended recipients. As an example, a user may click a "send" button in the user interface of an email client to transmit the electronic communication to the intended recipients. In certain embodiments, the electronic communication may be sent directly in response to establishment of the cultural translation object without requiring input from a user. Other methods of transmitting the electronic communication are also possible.

Figure 4:
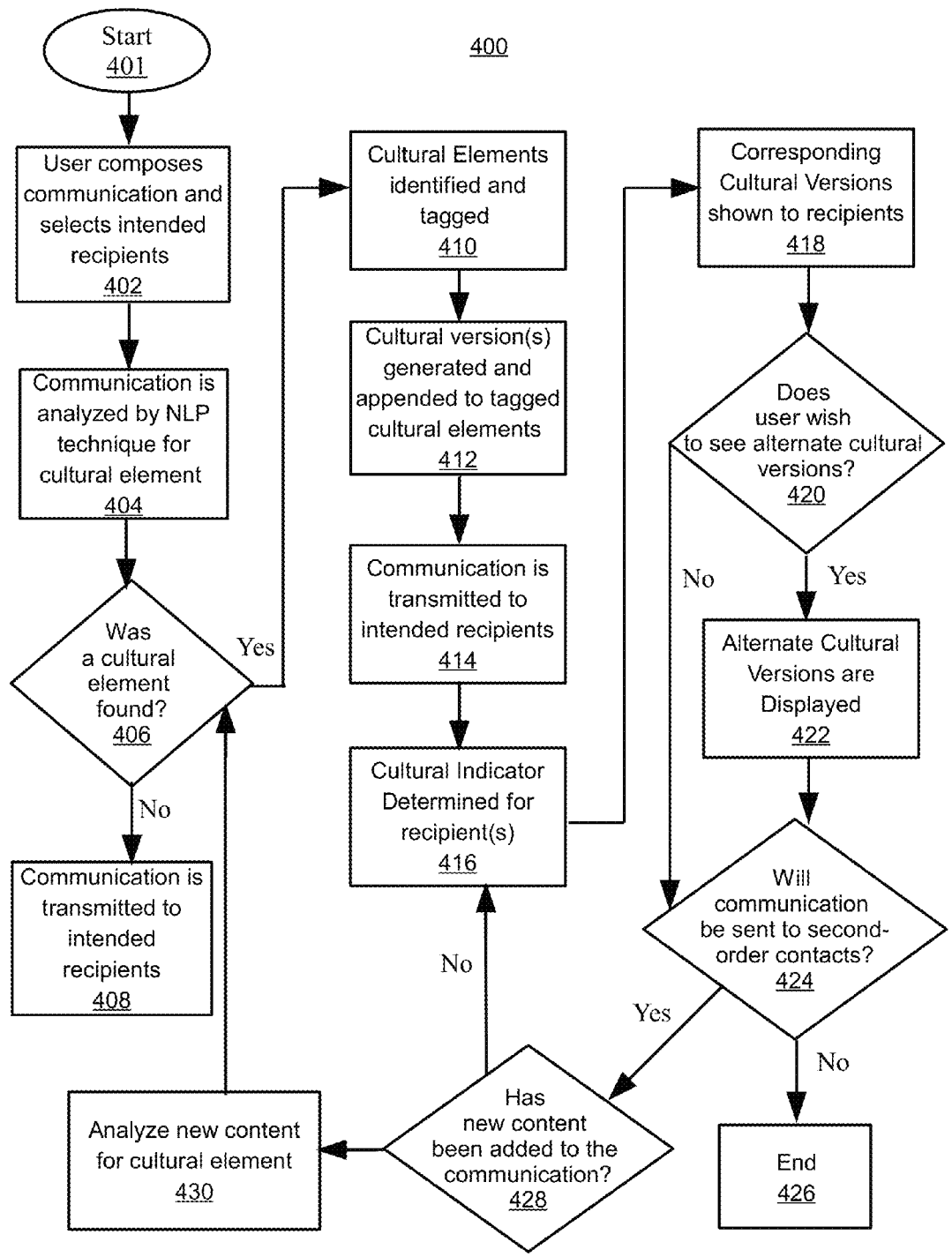
FIG. 4 is a flowchart illustrating a method of multicultural electronic communication management according to embodiments.

FIG. 4 is a flowchart illustrating a method 400 of multicultural electronic communication management according to embodiments. Aspects of FIG. 4 are directed toward determining one or more cultural-versions of a cultural element in an electronic communication, and presenting each cultural-version to an intended recipient with a cultural background corresponding to the cultural-version. As shown in FIG. 4, the method 400 may start at block 401. Additional steps and methods of carrying out the method 400 beyond those depicted explicitly herein are also possible.

At block 402, as described herein, a user may compose the contents of the electronic communication and select the intended recipients. In embodiments, block 402 of the method 400 may substantially correspond to block 310 of method 300. As describe herein, in embodiments each intended recipient of the electronic communication may have a different cultural background. At block 404, the communication may be analyzed by a natural language processing technique for one or more cultural elements that may be the source of cultural misunderstandings. At block 406, a decision may be made based on whether a cultural element was found in the electronic communication. In the event that a cultural element was not detected at block 404, the method 400 may proceed to block 408, and the electronic communication may be sent to the intended recipients.

In the event that a cultural element was detected by the natural language processing technique at block 404, at block 410 the cultural elements may be identified and tagged. In embodiments, block 410 of FIG. 400 may substantially correspond with blocks 340 and 350 of method 300. Identifying the cultural elements may include highlighting, marking, appending a comment, or otherwise annotating the electronic communication to indicate the cultural element. As described herein, at block 412 the method 400 may include generating one or more cultural-versions for each cultural element and appending the cultural-versions to the electronic communication. In embodiments, each cultural-version may be appended to its corresponding cultural element. At block 414, the method 400 may include transmitting the electronic communication including the appended cultural-versions to the intended recipients.

At block 416, the method 400 may include determining a cultural indicator for each recipient of the intended recipients selected by the user at block 402. As described herein, in certain embodiments, detecting the cultural indicator may be performed prior to sending the electronic communication (e.g., as in block 320 of method 300). In certain embodiments, determining the cultural indicator may be determined after transmission of the electronic communication. Determining the cultural indicator for the recipients may include analyzing profile dating containing information about the recipients. For example, the profile data may include a social media profile, a company employee database, or the like. Analyzing the profile data to determine the cultural indicator of the recipients may substantially correspond with the methods and techniques described at block 320.

At block 418, the cultural-versions generated at block 412 may be presented to the corresponding recipients. In embodiments, the presentation of the cultural-versions may be based on both the cultural-version and the cultural indicator determined for the recipient. As an example, an electronic communication may include two cultural-versions, and be sent to two recipients. The cultural indicators determined for the recipients may indicate that one recipient has a French cultural background while the other recipient has an Indian cultural background. Accordingly, at block 412 both a French cultural-version and an Indian cultural-version may be generated for one or more cultural elements of the electronic communication. At block 418, presenting the cultural-versions to the intended recipients may include presenting the French cultural-version to the recipient with the French cultural background, and the Indian cultural-version to the recipient with the French cultural background.

Aspects of the present disclosure relate to the recognition that in certain situations, recipients of an electronic communication may desire to see alternate cultural-versions other than those initially presented at block 418 (e.g., the first intended recipient may wish to view the cultural-version provided to the second recipient) At block 420, a recipient may indicate a desire to see an alternate cultural-version, and the method may proceed to block 422. As an example, referring to the example above, the recipient with the Indian cultural background may wish to view the cultural-version provided to the recipient with the French cultural background. Accordingly, at block 422, the method 400 may include displaying an alternate cultural-version to the user. In embodiments, the electric communication may include an interface having options that allow the recipients of the electronic communication to display and hide cultural-versions as they wish. If a user does not indicate a desire to view an alternative cultural-version at block 420, the method 400 may proceed directly to block 424.

At block 424, the method 400 may include determining whether the electronic communication will be sent to second-order contacts. The second-order contacts may include other recipients beyond those designated as recipients of the original electronic communication. For instance, a recipient of the electronic communication may desire to forward the electronic communication to another individual. Accordingly, in certain embodiments, in response to the user indicating a desire to send the electronic communication to second-order contacts (e.g., pressing the "forward" button of the email client), the method 400 may proceed to block 428. In the event that the electronic communication will not be sent to second-order contacts, the method 400 may conclude at block 426.

At block 428, the method 400 may include determining whether new content has been added to the electronic communication (e.g., forwarded communication). Determining whether new content has been added to the electronic communication may include using a natural language processing technique to parse the electronic communication, and ascertain whether or not the content is substantially similar (e.g., semantically, syntactically, or both) to the original electronic communication. In the event that additional content has not been added to the electronic communication, the method 400 may proceed to block 416 and follow the subsequent steps. In the event that new content has been appended to the electronic communication, the method 400 may proceed to block 430. At block 430, the new content of the electronic communication may be analyzed to determine whether or not a cultural element is present. The techniques used to analyze the new content of the electronic communication may substantially correspond to the techniques used at block 404. In response to analyzing the new content of the cultural element, the method 400 may proceed to decision block 406 and continue through the subsequent steps of method 400. Accordingly, aspects of the disclosure relate to generating a third cultural-version for the added recipient (e.g., second order contact) of the forwarded communication. Other steps other than those explicitly described herein are also possible.

Figure 5:
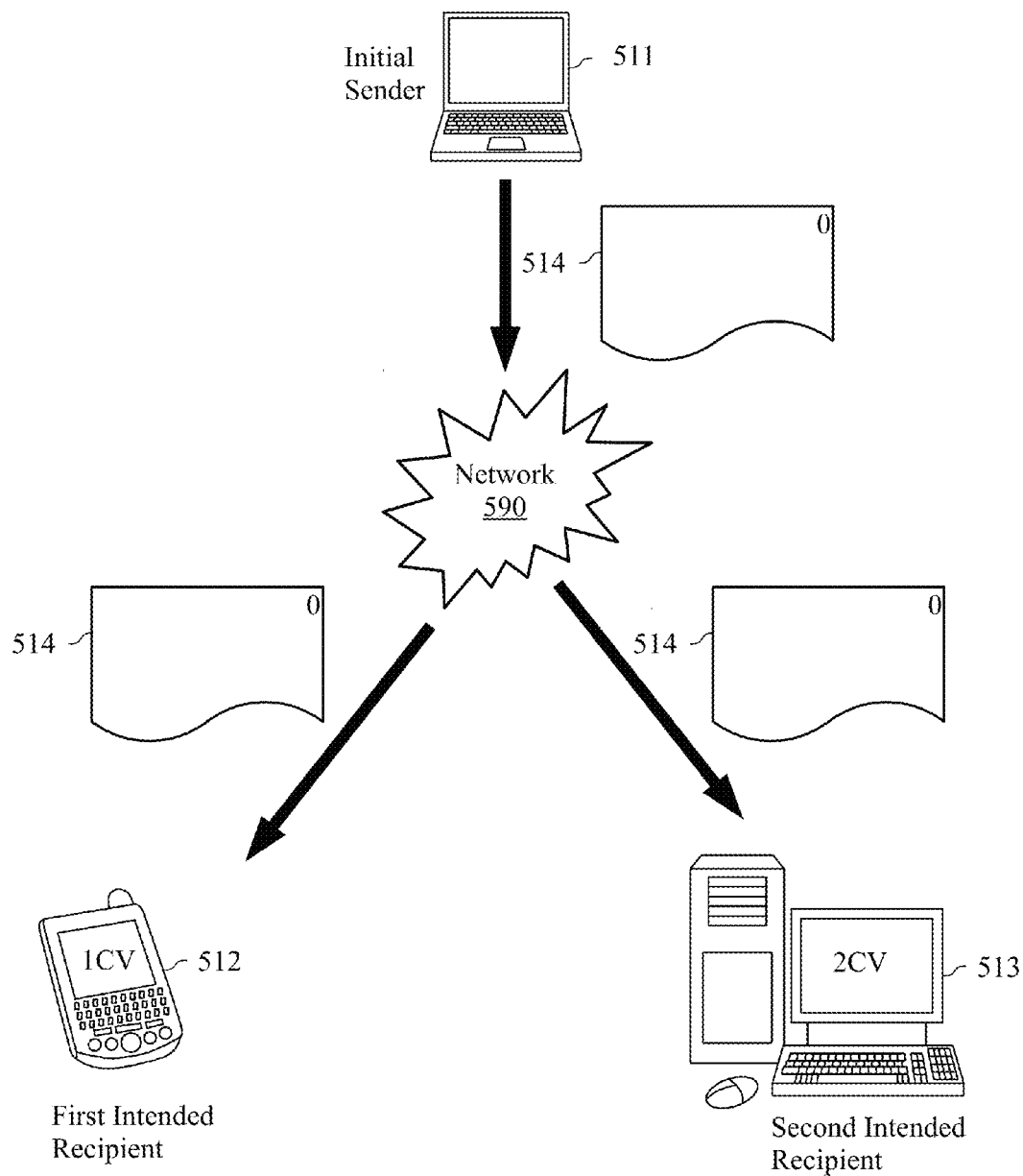
FIG. 5. shows an example use-case of multicultural electronic communication management according to embodiments.

FIG. 5. shows an example use-case 500 of multicultural electronic communication management according to embodiments. Aspects of FIG. 5 are directed toward an initial sender 511 (e.g., a user) sending an electronic communication 514 to a first intended recipient 512 and a second intended recipient 513 via a network 590. In certain embodiments, the original transmission 510 may substantially correspond with the method described in FIG. 3. As described herein, the initial sender 511 may select the first intended recipient 512 and the second intended recipient 513 as recipients of the electronic communication 514. Accordingly, a cultural indicator may be identified for both the first intended recipient 512 and the second intended recipient 513. For example, based on an analysis of profile data for each recipient, the first intended recipient 512 may be identified as having a Scandinavian cultural background, and the second intended recipient 513 may be identified as having an Australian cultural background.

Consistent with the techniques described herein, a cultural element of the electronic communication 514 may be identified, and a first and second cultural-version may be identified for the first 512 and second recipients 513 respectively based on the cultural element and the cultural indicator. A cultural translation object including both the first and second cultural-versions may be established, and the electronic communication 514 including the original message of the initial sender 511 (e.g., represented by the character "0" in the electronic communication 514 of FIG. 5) as well as the first and second cultural-versions may be transmitted to both the first 512 and second recipients 513. As shown in FIG. 5, the electronic communication 514 may be configured (e.g., via tagged blocks) such that the first cultural-version is displayed to the first intended recipient 512, and the second cultural-version is displayed to the second recipient 513.

Figure 6:
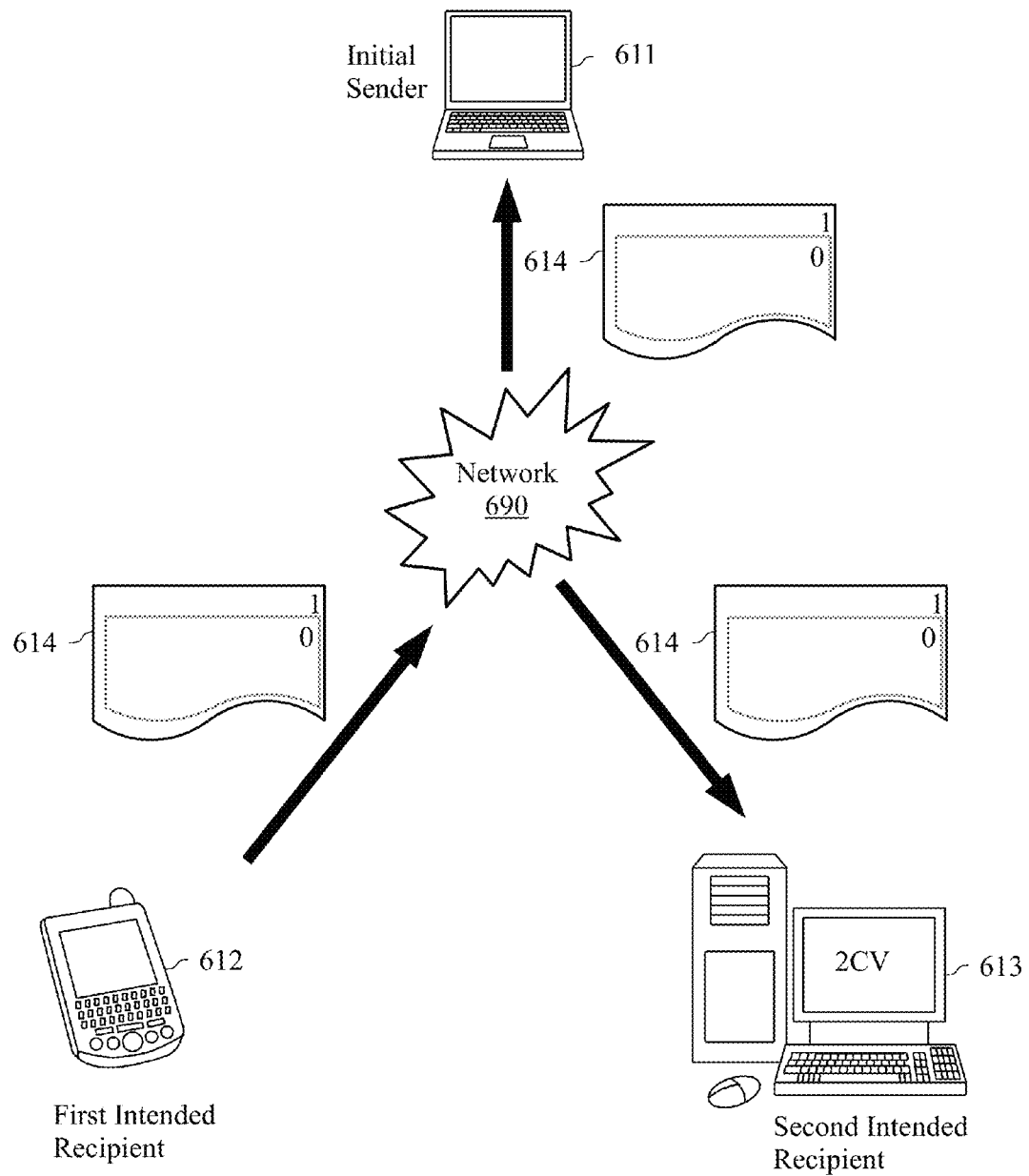
FIG. 6 shows an example use-case of multicultural electronic communication management according to embodiments.

FIG. 6 shows an example use-case 600 of multicultural electronic communication management according to embodiments. Aspects of the disclosure are directed toward managing replies (e.g., reply-alls) from recipients of an electronic communication. In embodiments, the first reply-all transmission 610 of FIG. 6 may take place in response to or after the original transmission 510 of FIG. 5. Aspects of the first reply-all transmission 610 are directed toward receiving, from the first intended recipient 612, a first reply-all communication 614 which includes the original message of the initial sender 611 (e.g., represented by the character "0" in the first reply-all communication 614 of FIG. 6) as well as a reply of the first intended recipient 612 (e.g., represented by the character "1" in the first reply-all communication 614 of FIG. 6). The electronic communication may be sent and delivered using a network 690. In embodiments, the first reply-all communication 614 may be configured to include both the first cultural-version and the second cultural-version. In embodiments, the first reply-all communication 614 may be received by the initial sender 611 and by the second intended recipient 613. As shown in FIG. 6, the first reply-all communication 614 may be configured to present the second cultural-version to the second intended recipient 613.

In certain embodiments, aspects of the disclosure are directed toward hiding (e.g., deleting, removing, disregarding, not including, not presenting) at least a portion of a cultural-version that does not correspond to the cultural background of a particular user. For instance, referring once again to FIG. 6, in response to receiving the first reply-all communication 614 from the first intended recipient 612, a second reply-all may be received from the second recipient 613 that does not include the first cultural-version (e.g., the first cultural-version may not correspond to the cultural background of the recipients of the second reply-all such as the original sender).

Figure 7:
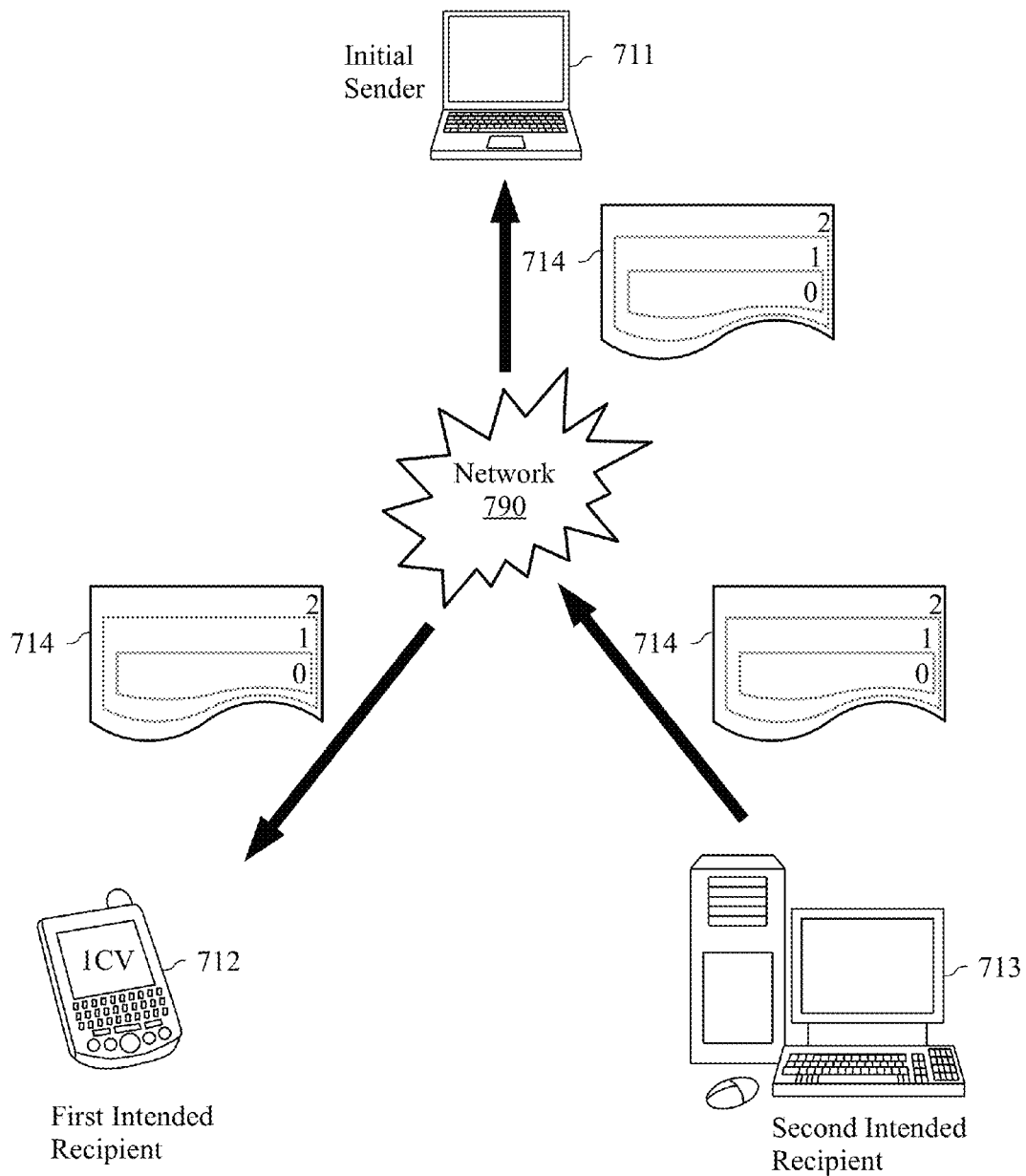
FIG. 7 shows an example use-case of multicultural electronic communication management according to embodiments.

FIG. 7 shows an example use-case 700 of multicultural electronic communication management according to embodiments. Aspects of the disclosure are directed toward managing replies (e.g., reply-alls) from recipients of an electronic communication. In embodiments, the second reply-all transmission 710 may take place in response to or after the first reply-all transmission 610 of FIG. 6. Aspects of the second reply-all transmission 710 are directed toward receiving, from the second intended recipient 713 in response to the first reply-all communication, a second reply-all communication 714 which includes the original message of the initial sender 611 (e.g., represented by the character "0" in the second reply-all communication 714 of FIG. 7) the first reply-all of the first intended recipient 712 (e.g., represented by the character "1" in the second reply-all communication 714 of FIG. 7) as well as a reply of the second intended recipient 713 (e.g., represented by the character "2" in the second reply-all communication 714 of FIG. 7). In embodiments, the electronic communication may be sent and delivered using a network 790. As described herein, in certain embodiments the first cultural-version may be presented to the first intended recipient 712.

As described herein, aspects of the disclosure are directed toward hiding (e.g., deleting, removing, disregarding, not including, not presenting) at least a portion of a cultural-version that does not correspond to the cultural background of a particular user. For instance, referring now to FIG. 7, the second intended recipient 713 may receive a reply-all message from the first intended recipient 712 that does not include the first cultural-version (e.g., as the first cultural-version was generated for the first intended recipient 712, it may not be relevant to the second intended recipient 713). Further, in response to the first reply-all, in certain embodiments aspects of the disclosure may be directed toward receiving (e.g., by the original sender) a second reply-all communication 714 which includes the first reply-all (and may include/present the second cultural-version but perhaps not include/present the first cultural-version). The second reply-all 714 may be received by the original sender 711 and the first intended recipient 712 via the network 790.

Consider the following example. An initial sender may generate an electronic communication and designate a first intended recipient and a second intended recipient. As described herein, cultural indicators for each of the intended recipients may be analyzed, and the first intended recipient may be determined to be of a Greek cultural background, and the second intended recipient may be determined to be of a Swedish cultural background. One or more cultural elements of the electronic communication may be detected, and a first cultural-version of the cultural elements may be generated for the first intended recipient and a second cultural-version may be generated for the second intended recipient. Accordingly, the electronic communication may be transmitted to both intended recipients, and configured such that the first cultural-version is presented to the first intended recipient and the second cultural-version is presented to the second intended recipient.

In response to the electronic communication, the first intended recipient may send a first reply-all message to the original sender and the second intended recipient. In embodiments, the first reply-all message may be processed using the techniques described herein to generate original cultural-versions of the first reply-all message for both the original sender and the second intended recipient. In certain embodiments, the first reply-all message may be configured such that the first cultural-version is not presented to the original sender or the second intended recipient (e.g., the cultural-version generated based on Greek culture may not be relevant to the original sender or the second intended recipient.)

In response to receiving the first reply-all message from the first intended recipient, the second user may compose a second reply-all message, selecting the original sender and the first intended recipient as recipients. In embodiments, aspects of the disclosure may include processing the electronic communication to determine the cultural background of the original sender of the electronic communication. In certain situations, the original sender of the electronic communication may be determined to be of the same cultural background as the second intended recipient (e.g., both may have a Swedish cultural background.) Accordingly, in embodiments, the second reply-all may be configured such that the second cultural-version is presented to the original sender, but not presented to the first intended recipient. Other configurations of the electronic communication beyond those described explicitly herein are also possible (e.g., various arrangements or configurations of embedding cultural-versions or cultural-version code).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at anytime, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for multicultural electronic communication management, the method comprising:
    initiating, by a user, an electronic communication configured to be transmitted to both a first intended recipient and a second intended recipient;
    identifying, based on a set of profile data, a first cultural indicator for the first intended recipient;
    identifying, based on the set of profile data, a second cultural indicator for the second intended recipient;
    detecting, using a natural language processing technique, a cultural element of the electronic communication;
    determining, based on both the first cultural indicator and the cultural element, a first cultural-version of the cultural element for the first intended recipient;
    determining, based on both the second cultural indicator and the cultural element, a second cultural-version of the cultural element for the second intended recipient;
    establishing, using both the first cultural-version and the second cultural-version, a cultural translation object in the electronic communication; and
    transmitting, in response to establishing the cultural translation object in the electronic communication, the electronic communication to both the first intended recipient and the second intended recipient.

2. The method of claim 1, wherein the set of profile data includes a corporate human resources database.

3. The method of claim 1, wherein the set of profile data includes an e-mail signature.

4. The method of claim 1, wherein the cultural element is selected from a group consisting of at least one of: a tone element, a language-use element, or a culture-specific element.

5. The method of claim 1, wherein determining, based on both the first cultural indicator and the cultural element, the first cultural-version of the cultural element for the first intended recipient includes:
identifying a cultural database which corresponds to the first cultural indicator;
searching the cultural database for the cultural element; and
ascertaining a set of matches for the cultural element in the cultural database.

6. The method of claim 5, wherein determining, based on both the first cultural indicator and the cultural element, the first cultural-version of the cultural element for the first intended recipient includes at least one of:
determining, based on the set of matches, the first cultural-version; or
displaying the set of matches to the user, and
receiving a user input which selects the first cultural-version based on the set of matches.

7. The method of claim 1, wherein determining, based on both the first cultural indicator and the cultural element, the first cultural-version of the cultural element for the first intended recipient includes:
analyzing, using a set of culture-oriented natural language processing techniques, the cultural element.

8. The method of claim 1, further comprising:
tagging the cultural element with a tagged block;
appending to the tagged block both the first cultural-version and the second cultural-version; and
establishing, both based on and in response to appending to the tagged block both the first cultural-version and the second cultural-version, the cultural translation object.

9. The method of claim 1, wherein the cultural translation object includes both the first cultural-version and the second cultural-version.

10. The method of claim 1, wherein the cultural translation object is configured to present the first cultural-version to the first intended recipient and the second cultural-version to the second intended recipient.

11. The method of claim 1, wherein the cultural element includes a lack of a greeting, the first cultural-version includes a first greeting, and the second cultural-version includes a second greeting.

12. The method of claim 1, further comprising:
receiving, from the first intended recipient, a first reply-all which includes the electronic communication; and
receiving, from the second intended recipient in response to the first reply-all, a second reply-all which includes the first reply-all, wherein the first cultural-version is not presented in the second-reply all.

13. The method of claim 1, further comprising:
receiving, by the second intended recipient from the first intended recipient, a first reply-all which includes the electronic communication, wherein the first cultural-version is not presented in the first reply-all; and
receiving, from the second intended recipient in response to the first reply-all, a second reply-all which includes the first reply-all, wherein the second cultural-version is presented in the second reply-all.

14. The method of claim 1, further comprising:
receiving, by an added recipient from the first intended recipient, a forwarded communication, wherein a third cultural-version is presented in the forwarded communication.

15. The method of claim 1, wherein the set of profile data includes a computer network address.

16. The method of claim 1, wherein the set of profile data includes an interne protocol address.

17. The method of claim 1, wherein the set of profile data includes a time zone.

18. The method of claim 1, wherein the set of profile data includes a keyboard layout.

19. The method of claim 1, wherein the set of profile data includes a social media profile.

20. The method of claim 1, wherein the set of profile data includes a machine-learned cultural-norm.

* * * * *